United States Patent [19]
Nozaki et al.

[11] Patent Number: 5,315,613
[45] Date of Patent: May 24, 1994

[54] LASER DIODE PUMPED SOLID LASER

[75] Inventors: Nobuharu Nozaki; Shinji Mitsumoto; Yoji Okazaki; Takashi Adachi, all of Kanagawa, Japan

[73] Assignee: Fuji Photo Film Co., Ltd., Kanagawa, Japan

[21] Appl. No.: 70,922

[22] Filed: Jun. 4, 1993

[30] Foreign Application Priority Data

Jun. 10, 1992 [JP] Japan .................................. 4-149773

[51] Int. Cl.$^5$ .............................................. H01S 3/09
[52] U.S. Cl. .................................... 372/69; 372/71; 372/101
[58] Field of Search .................. 372/41, 71, 75, 101, 372/69

[56] References Cited

U.S. PATENT DOCUMENTS 4,909,596  3/1990  Okazaki et al. .
5,124,999  6/1992  Okazaki et al. .
5,197,072  5/1993  Harada et al. .................... 372/22

FOREIGN PATENT DOCUMENTS 62-189783  8/1987  Japan .

Primary Examiner—Rodney B. Bovernick
Assistant Examiner—Robert E. Wise
Attorney, Agent, or Firm—Sughrue, Mion, Zinn, Macpeak & Seas

[57] ABSTRACT

A laser diode pumped solid laser comprises a solid laser medium, to which a rare earth metal has been added, a semiconductor laser, which produces a laser beam for pumping the solid laser medium, and a condensing lens, which causes the laser beam to converge in the solid laser medium. The condensing lens is located such that an optical axis of the condensing lens may deviate in the width direction of a semiconductor laser active layer from a center of irradiation area of the semiconductor laser. The amount of light returning to the semiconductor laser is thereby reduced markedly, and good stability in the output power of the laser diode pumped solid laser is obtained. A nonlinear optical material for converting the wavelength of a laser beam, which has been produced by the solid laser medium, into a different wavelength may be located in a solid laser resonator.

4 Claims, 2 Drawing Sheets

LASER DIODE PUMPED SOLID LASER

BACKGROUND OF THE INVENTION

1. Field of the Invention

This invention relates to a laser diode pumped solid laser. This invention particularly relates to a laser diode pumped solid laser, wherein the amount of light returning to a laser diode (a semiconductor laser) is kept small.

2. Description of the Prior Art

Laser diode pumped solid lasers have been proposed in, for example, Japanese Unexamined Patent Publication No. 62(1987)-189783. The proposed laser diode pumped solid lasers comprise a solid laser medium, to which a rare earth metal, such as neodymium (Nd), has been added. The solid laser medium is pumped by a semiconductor laser. In such laser diode pumped solid lasers, a laser beam, which has been produced by a semiconductor laser and which serves as a pumping beam, is ordinarily condensed by a condensing lens such that the laser beam may converge in a solid laser medium.

However, with the laser diode pumped solid laser described above, problems occur in that the oscillation of the semiconductor laser becomes unstable due to light returning from the solid laser medium to the semiconductor laser, and the intensity and the wavelength of a laser beam produced by the semiconductor laser sway. As a result, noise occurs, and the output power of the laser diode pumped solid laser fluctuates. The primary reason for the occurrence of much return light from the solid laser medium is that the beam output end of the semiconductor laser and the surface of the solid laser medium are in confocal relation to each other with respect to the condensing lens, which is located between the semiconductor laser and the solid laser medium.

Therefore, an attempt has heretofore been made in order to reduce the amount of return light by locating the solid laser medium such that the position of the surface of the solid laser medium may not coincide with the position, at which an image of the laser beam is formed by the condensing lens. However, with such an attempt, good stability in the output power of the laser diode pumped solid laser cannot be obtained.

SUMMARY OF THE INVENTION

The primary object of the present invention is to provide a laser diode pumped solid laser, wherein the amount of light returning to a semiconductor laser is reduced markedly, and good stability in the output power of the laser diode pumped solid laser is thereby obtained.

The present invention provides a laser diode pumped solid laser comprising:
i) a solid laser medium, to which a rare earth metal has been added,
ii) a semiconductor laser, which produces a laser beam for pumping the solid laser medium, and
iii) a condensing lens, which causes the laser beam to converge in the solid laser medium,
wherein the condensing lens is located such that an optical axis of the condensing lens may deviate in the width direction of a semiconductor laser active layer from a center of irradiation area of the semiconductor laser.

With the laser diode pumped solid laser in accordance with the present invention wherein the condensing lens is located in the manner described above, the semiconductor laser beam, which has passed through the condensing lens, impinges obliquely upon the surface of the solid laser medium. Therefore, the semiconductor laser beam, which has been reflected from the surface of the solid laser medium, follows an optical path different from the optical path, along which the semiconductor laser beam impinged upon the surface of the solid laser medium. Accordingly, the amount of light returning to the semiconductor laser becomes small.

Also, with the laser diode pumped solid laser in accordance with the present invention, the position of the condensing lens is deviated in the width direction of the semiconductor laser active layer from the center of irradiation area of the semiconductor laser. Therefore, markedly large effects of reducing the amount of the return light can be obtained even with a slight amount of deviation in position. How these effects can be obtained will be described hereinbelow.

FIG. 3 is an explanatory view showing how the position of a condensing lens may be deviated from the center of irradiation area of a semiconductor laser. With reference to FIG. 3, a laser diode pumped solid laser comprises a semiconductor laser 10, a distributed index type of condensing lens 11, a solid laser medium 12, and a resonator mirror 13. In experiments carried out on the laser diode pumped solid laser, the position of the condensing lens 11 was changed such that the optical axis of the condensing lens 11 might deviate from the center of irradiation area of the semiconductor laser 10, and the degree of noise occurring with the semiconductor laser 10 was investigated. The axis extending in the direction, along which a laser beam 14 travels from the center of irradiation area of the semiconductor laser 10, is referred to as the Z axis. The amount of deviation of the optical axis of the condensing lens 11, which deviation is taken in the width direction of a semiconductor laser active layer 10a from the Z axis, is defined with the X coordinate. Also, the amount of deviation of the optical axis of the condensing lens 11, which deviation is taken in the thickness direction of the semiconductor laser active layer 10a from the Z axis, is defined with the Y coordinate.

FIG. 4 is a graph showing the degree of noise occurring when the optical axis of the condensing lens 11 is deviated in the Y direction from the Z axis. FIG. 5 is a graph showing the degree of noise occurring when the optical axis of the condensing lens 11 is deviated in the X direction from the Z axis. In each of FIGS. 4 and 5, the horizontal axis represents the amount of deviation (in units of mm) between the optical axis of the condensing lens 11 and the center of irradiation area of the semiconductor laser 10. Also, the vertical axis represents the ratio of the level of noise to the output power of the semiconductor laser 10 (the ratio in terms of the peak-to-peak value). As illustrated in FIG. 4, in cases where the optical axis of the condensing lens 11 is deviated in the Y direction (i.e., in the thickness direction of the semiconductor laser active layer 10a) from the Z axis, the optical axis of the condensing lens 11 must be deviated at least 0.2 mm or at least 0.3 mm such that markedly large effects of reducing noise may be obtained as compared with when the optical axis of the condensing lens 11 is not deviated (i.e. Y=0). On the other hand, as illustrated in FIG. 5, in cases where the optical axis of the condensing lens 11 is deviated in the X direction (i.e., in the width direction of the semiconductor laser active layer 10a) form the Z axis, markedly large effects of reducing noise can be obtained when the optical axis of the condensing lens 11 is deviated at least 0.1 mm.

As described above, with the laser diode pumped solid laser in accordance with the present invention, the amount of deviation in position of the condensing lens can be kept small. Therefore, the amount of the semiconductor laser beam, which impinges upon the solid laser medium and which serves as the pumping beam, can be kept large, and a solid laser beam having a high intensity can thereby be obtained.

DESCRIPTION OF THE PREFERRED EMBODIMENTS

The present invention will hereinbelow be described in further detail with reference to the accompanying drawings.

Figure 1:
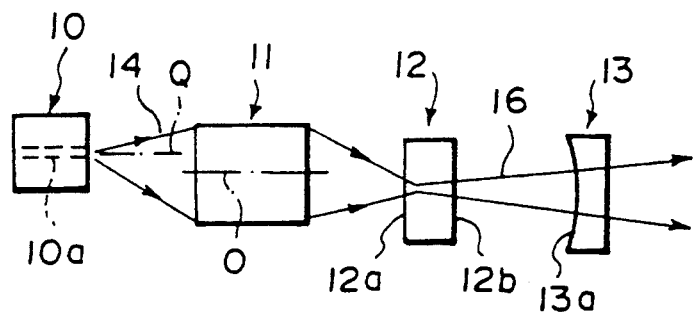
FIG. 1 is a plan view showing a first embodiment of the laser diode pumped solid laser in accordance with the present invention.

FIG. 1 is a plan view showing a first embodiment of the laser diode pumped solid laser in accordance with the present invention. The laser diode pumped solid laser comprises a semiconductor laser 10, which produces a laser beam 14 serving as a pumping beam, and a YAG crystal 12, which is a solid laser medium doped with neodymium (Nd). (The YAG crystal, which is a solid laser medium doped with neodymium, will be hereinafter be referred to as the Nd:YAG crystal.) The laser diode pumped solid laser also comprises a condensing lens 11 for condensing the laser beam 14, which has been radiated as a divergent beam out of the semiconductor laser 10. The condensing lens 11 causes the laser beam 14 to converge in the Nd:YAG crystal 12. The laser diode pumped solid laser further comprises a resonator mirror 13, which is located on the side downstream from the Nd:YAG crystal 12, i.e. on the right side of the Nd:YAG crystal 12 in FIG. 1. The temperature of the semiconductor laser 10 is set at a predetermined temperature by a Peltier apparatus (not shown) and a temperature adjusting circuit (not shown).

By way of example, as the semiconductor laser 10, XT-303 is used which ha an output power of 500 mW and which is supplied by Sony Corp. The semiconductor laser 10 produces the laser beam 14 having a wavelength λ1 of 808 nm. As the condensing lens 11, a distributed index lens (trade name: SELFOC lens) having a pitch of 0.25 is employed. The reflectivity of an end face of the condensing lens 11 with respect to the laser beam 14 is 0.1%. The radius of curvature R of a mirror surface 13a of the resonator mirror 13 is equal to 20 mm. The Nd:YAG crystal 12 has been doped with, for example, 1 at % of Nd and has a thickness of 1 mm.

The neodymium atoms contained in the Nd:YAG crystal 12 are stimulated by the laser beam 14, which converges in the Nd:YAG crystal 12. The Nd:YAG crystal 12 thereby produces a laser beam 16 having a wavelength λ2 of 946 nm. A laser beam having wavelength λ3 of 1,064 nm is also produced by the Nd:YAG crystal 12. End faces 12a and 12b of the Nd:YAG crystal 12 and the mirror surface 13a of the resonator mirror 13 are provided with predetermined coatings. The reflectivities of the respective surfaces with respect to the wavelength λ1 of 808 nm, the wavelength λ2 of 946 nm, and the wavelength λ3 of 1,064 nm are as shown below.

|  | λ1 = 808 nm | λ2 = 946 nm | λ3 = 1,064 nm |
| --- | --- | --- | --- |
| End face 12a | Approx. 2% | 99.8% or more | 60% or less |
| End face 12b | Approx. 5% | 1% or less | 10% or less |
| Mirror surface 13a | — | 99.8% or more | — |

Therefore, the laser beam 16 undergoes laser oscillation between the end face 12a and the mirror surface 13a. Part of the laser beam 16 passes through the resonator mirror 13 and is taken out of the laser diode pumped solid laser. Also, the gain of the laser beam having the λ3 of 1,064 nm is kept small.

In this embodiment, the condensing lens 11 is located such that an optical axis O of the condensing lens 11 may be deviated 0.1 mm in the width direction of the semiconductor laser active layer 10a (i.e., in the vertical direction in FIG. 1) from a center of irradiation area Q of the semiconductor laser 10. With this configuration, the amount of light, which is reflected by the entry end face 12a of the Nd:YAG crystal 12 and returns to the semiconductor laser 10, can be kept small.

Figure 5:
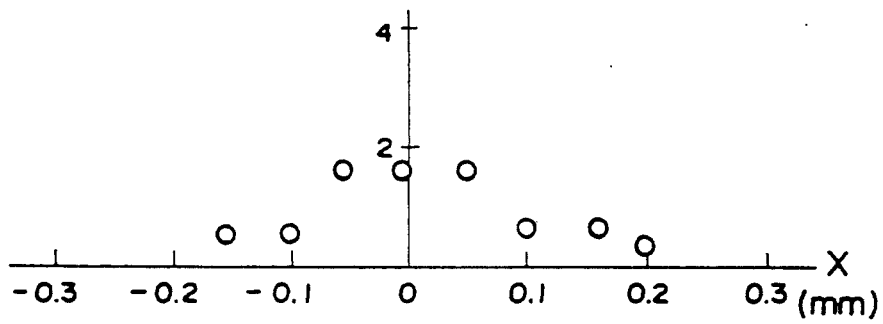
FIG. 5 is a graph showing an example of the relationship between the level of semiconductor laser noise and the amount of deviation in position of a condensing lens when the position of the condensing lens is deviated in a direction, which is defined in the present invention, from the semiconductor laser.

FIG. 5 shows the results of measurement of semiconductor laser noise, which were obtained when the amount of deviation of the optical axis O of the condensing lens 11 from the center of irradiation area Q of the semiconductor laser 10 was changed to various values in the first embodiment described above. As is clear from FIG. 5, with this embodiment wherein the amount of deviation of the optical axis O of the condensing lens 11 from the center of irradiation area Q of the semiconductor laser 10 is set to 0.1 mm, sufficient effects of reducing noise can be obtained. Also, with this embodiment wherein the amount of light returning to the semiconductor laser 10 is reduced, fluctuations in the wavelength of the laser beam produced by the semiconductor laser 10 can be restricted, and fluctuations in the absorption of the laser beam 14 by the Nd:YAG crystal 12 can also be kept small. Therefore, the output power of the solid laser beam 16 can be kept very stable.

Further, with the aforesaid embodiment wherein the amount of deviation in position of the condensing lens 11 can be kept small, the amount of the laser beam 14, which impinges upon the Nd:YAG crystal 12, can be kept large, and the solid laser beam 16 having a high intensity can thereby be obtained.

Figure 2:
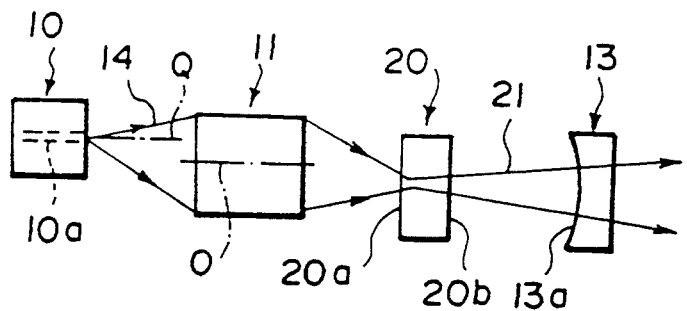
FIG. 2 is a plan view showing a second embodiment of the laser diode pumped solid laser in accordance with the present invention.
Figure 3:
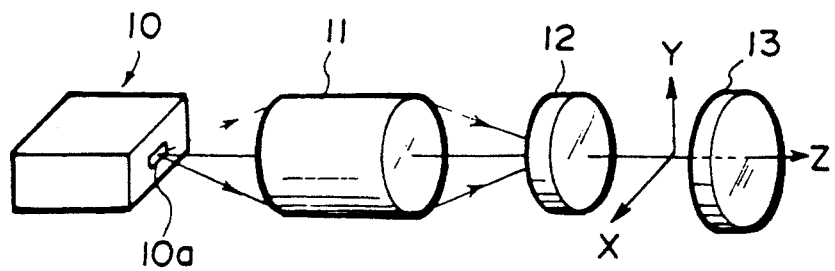
FIG. 3 is an explanatory view showing how the position of a condensing lens may be deviated from the center of irradiation area of a semiconductor laser.
Figure 4:
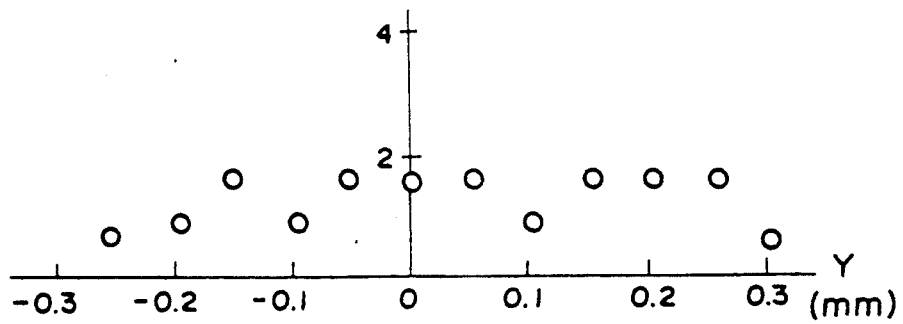
FIG. 4 is a graph showing an example of the relationship between the level of semiconductor laser noise and the amount of deviation in position of a condensing lens when the position of the condensing lens is deviated in a direction, which is different from the direction of deviation defined in the present invention, from the semiconductor laser.

A second embodiment of the laser diode pumped solid laser in accordance with the present invention will be described hereinbelow with reference to FIG. 2. The second embodiment is basically different from the first embodiment in that an Nd:YVO$_4$ crystal 20 is employed as the solid laser medium in lieu of the Nd:YAG crystal 12. The semiconductor laser 10 employed in the second embodiment is of the same type as the semiconductor laser 10 employed in the first embodiment, except that the output power of the semiconductor laser 10 employed in the second embodiment is 200 mW. The temperature of the semiconductor laser 10 is adjusted in the same manner as that in the first embodiment. The radius of curvature R of the resonator mirror 13 is equal to 20 mm. With this configuration, the Nd:YVO$_4$ crystal 20 is stimulated by the laser beam 14 having a wavelength $\lambda 1$ of 808 nm and produces a laser beam 21 having a wavelength $\lambda 2$ of 1,064 nm.

The reflectivities of end faces 20a and 20b of the Nd:YVO$_4$ crystal 20 and the mirror surface 13a of the resonator mirror 13 with respect to the wavelength $\lambda 1$ of 808 nm and the wavelength $\lambda 2$ of 1,064 nm are as shown below.

|  | $\lambda 1$ = 808 nm | $\lambda 2$ = 1,064 nm |
| --- | --- | --- |
| End face 20a | Approx. 2% | 99.8% or more |
| End face 20b | Approx. 5% | 2% or less |
| Mirror surface 13a | — | 99.8% or more |

Therefore, the laser beam 21 undergoes laser oscillation between the end face 20a and the mirror surface 13a. Part of the laser beam 21 passes through the resonator mirror 13 and is taken out of the laser diode pumped solid laser.

In this embodiment, the condensing lens 11 is located such that an optical axis O of the condensing lens 11 may be deviated 0.1 mm in the width direction of the semiconductor laser active layer 10a (i.e., in the vertical direction in FIG. 2) from a center of irradiation area Q of the semiconductor laser 10. With this configuration, the amount of light, which is reflected by the entry end face 20a of the Nd:YVO$_4$ crystal 20 and returns to the semiconductor laser 10, can be kept small, and the output power of the solid laser beam 21 can be kept very stable.

In the first and second embodiments described above, the amount of deviation in position between the optical axis of the condensing lens 11 and the center of irradiation area of the semiconductor laser 10 is set to 0.1 mm. In the laser diode pumped solid laser in accordance with the present invention, the amount of deviation in position between the optical axis of the condensing lens 11 and the center of irradiation area of the semiconductor laser 10 is not limited to 0.1 mm and may be set to any of other appropriate values.

Also, the solid laser medium employed in the laser diode pumped solid laser in accordance with the present invention is not limited to the Nd:YAG crystal and the Nd:YVO$_4$ crystal, and may be one of other known media, such as NYAB, LNP, and Nd:YLF.

Figure 6:
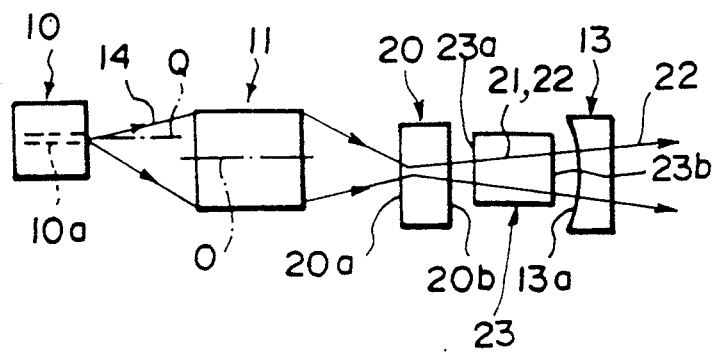
FIG. 6 is a plan view showing a third embodiment of the laser diode pumped solid laser in accordance with the present invention.

The present invention is also applicable to a laser diode pumped solid laser wherein, for example, a crystal of a nonlinear optical material is located in the region inside of a resonator, and a solid laser beam is converted into its second harmonic, or the like. A third embodiment of the laser diode pumped solid laser in accordance with the present invention, which is constituted in such a manner, will be described hereinbelow with reference to FIG. 6. The third embodiment is basically different from the second embodiment of FIG. 2 in that a KTP crystal 23 serving as a nonlinear optical material is located between the Nd:YVO$_4$ crystal 20 and the resonator mirror 13. The temperature of the semiconductor laser 10 is adjusted in the same manner as that in the first and second embodiments. Also, the temperature of the entire solid laser resonator including the KTP crystal 23 is set at a predetermined temperature by a Peltier apparatus (not shown) and a temperature adjusting circuit (not shown).

In the third embodiment, the laser beam 21 having a wavelength $\lambda 2$ of 1,064 nm is converted by the KTP crystal 23 into its second harmonic 22, which has a wavelength $\lambda 3 = \lambda 2/2 = 532$ nm. The reflectivities of the end faces 20a and 20b of the Nd:YVO$_4$ crystal 20, end faces 23a and 23b of the KTP crystal 23, and the mirror surfaces 13a of the resonator mirror 13 with respect to the wavelength $\lambda 1$ of 808 nm, the wavelength $\lambda 2$ of 1,064 nm, and the wavelength $\lambda 3$ of 532 nm are as shown below.

|  | $\lambda 1$ = 808 nm | $\lambda 2$ = 1,064 nm | $\lambda 3$ = 532 nm |
| --- | --- | --- | --- |
| End face 20a | Approx. 2% | 99.8% or more | — |
| End face 20b | Approx. 5% | 2% or less | 90% or more |
| End face 23a | — | 0.2% or less | 1% or less |
| End face 23b | — | 0.2% or less | 1% or less |
| Mirror surface 13a | — | 99.8% or more | 10% or less |

Therefore, the laser beam 21 undergoes laser oscillation between the end face 20a and the mirror surface 13a. Also, the second harmonic 22 undergoes laser oscillation between the end face 20b and the mirror surface 13a. Part of the second harmonic 22 passes through the resonator mirror 13 and is taken out of the laser diode pumped solid laser.

In the third embodiment, the amount of deviation in position between the optical axis of the condensing lens 11 and the center of irradiation area of the semiconductor laser 10, which deviation is taken in the X direction, is set to 0.16 mm. In such cases, fluctuations in the output power of the second harmonic 22 having the wavelength of 532 nm were ±2.3%, and the level of noise in the output power was 1.3% p-p. In a comparative example, a laser diode pumped solid laser was constituted in the same manner as that in the third embodiment, except that the amount of deviation in position between the optical axis of the condensing lens 11 and the center of irradiation area of the semiconductor laser 10 was set to 0 (zero). With the comparative example, fluctuations in the output power of the second harmonic 22 were ±20%, and output power jump occurred clearly. These results clearly indicates that the effects of reducing the return light can be obtained also with the third embodiment.

The nonlinear optical material used when the solid laser beam is converted into its second harmonic, or the like, is not limited to the KTP crystal and may be selected from, for example, BNNB, KNbO$_3$, LiIO$_3$, Urea, 3,5-dimethyl-1-(4-nitrophenyl)pyrazole described in U.S. Pat. No. 5,124,999, and 3,5-dimethyl-1-(4-nitrophenyl)-1,2,4-triazole described in U.S. Pat. No. 4,909,596.

What is claimed is:

1. A laser diode pumped solid laser comprising:
   i) a solid laser medium, to which a rare earth metal has been added,
   ii) a semiconductor laser, which produces a laser beam for pumping the solid laser medium, and
   iii) a condensing lens, which causes the laser beam to converge in the solid laser medium, wherein the condensing lens is located such that an optical axis of the condensing lens may deviate in the width direction of a semiconductor laser active layer from a center of irradiation area of the semiconductor laser.

2. A laser diode pumped solid laser as defined in claim 1 wherein a nonlinear optical material for converting the wavelength of a laser beam, which has been produced by the solid laser medium, into a different wavelength is located in a solid laser resonator.

3. A laser diode pumped solid laser as defined in claim 2 wherein the laser beam, which has been produced by the solid laser medium, is converted into its second harmonic.

4. A laser diode pumped solid laser as defined in claim 1 wherein the rare earth metal is neodymium.

* * * * *